US008618010B2

(12) United States Patent
Pourarian et al.

(10) Patent No.: US 8,618,010 B2
(45) Date of Patent: Dec. 31, 2013

(54) INTERSTITIAL METAL HYDRIDE CATALYST ACTIVITY REGENERATION PROCESS

(75) Inventors: Faiz Pourarian, Wexford, PA (US); Marc A. Portnoff, Pittsburgh, PA (US); David A. Purta, Gibsonia, PA (US); Margaret A. Nasta, McKeesport, PA (US); Jingfeng Zhang, Gibsonia, PA (US); Heather A. Elsen, Bethlehem, PA (US); Patricia A. Bielenberg, Easton, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 223 days.

(21) Appl. No.: 12/948,539

(22) Filed: Nov. 17, 2010

(65) Prior Publication Data
US 2011/0119991 A1 May 26, 2011

Related U.S. Application Data

(60) Provisional application No. 61/281,950, filed on Nov. 24, 2009.

(51) Int. Cl.
*B01J 38/04* (2006.01)
(52) U.S. Cl.
USPC ............................................. 502/34; 502/514
(58) Field of Classification Search
USPC ............................................. 502/34, 53, 514
See application file for complete search history.

(56) References Cited

U.S. PATENT DOCUMENTS

| | | | |
|---|---|---|---|
| 2,881,131 | A | 4/1959 | Kearby |
| 3,736,265 | A | 5/1973 | Suggitt |
| 3,758,614 | A | 9/1973 | Mertzweiller et al. |
| 4,025,606 | A | 5/1977 | Acres |
| 4,040,410 | A | 8/1977 | Libowitz |
| 4,120,763 | A | 10/1978 | Breda et al. |
| RE30,083 | E | 8/1979 | Reilly et al. |
| 4,279,722 | A | 7/1981 | Kirkbride |
| 4,302,436 | A | 11/1981 | Sirovich et al. |
| 4,492,769 | A | 1/1985 | Blanchard et al. |
| 4,545,879 | A | 10/1985 | Wan et al. |
| 4,556,551 | A | 12/1985 | Wallace et al. |
| 4,560,816 | A | 12/1985 | Davis, Jr. |
| 5,286,698 | A | 2/1994 | Carberry et al. |
| 5,332,705 | A | 7/1994 | Huang et al. |
| 5,525,435 | A | 6/1996 | Pourarian |
| 5,695,530 | A | 12/1997 | Hong et al. |
| 6,017,845 | A | 1/2000 | Ovalles et al. |
| 6,040,087 | A | 3/2000 | Kawakami |
| 6,165,643 | A | 12/2000 | Doyle et al. |
| 6,171,479 | B1 | 1/2001 | Ovalles et al. |
| 6,403,523 | B1 | 6/2002 | Cantrell et al. |
| 6,670,490 | B1 | 12/2003 | Campos et al. |
| 6,680,042 | B1 | 1/2004 | Schulz et al. |
| 7,157,401 | B2 | 1/2007 | Purta et al. |
| 7,387,712 | B2 | 6/2008 | Purta et al. |
| 7,455,927 | B2 | 11/2008 | DiSalvo, Jr. et al. |
| 7,601,329 | B2 | 10/2009 | Vajo et al. |
| 7,700,069 | B2 | 4/2010 | Stephens |
| 2002/0013221 | A1 | 1/2002 | Thompson et al. |
| 2002/0177735 | A1 | 11/2002 | Kanamori et al. |
| 2003/0073571 | A1 | 4/2003 | Heijden et al. |
| 2004/0074759 | A1 | 4/2004 | Purta et al. |
| 2004/0074760 | A1 | 4/2004 | Portnoff et al. |
| 2004/0077485 | A1 | 4/2004 | Purta et al. |
| 2005/0202965 | A1 | 9/2005 | Cavalcanti et al. |
| 2005/0274065 | A1 | 12/2005 | Portnoff et al. |
| 2006/0096893 | A1 | 5/2006 | De Almeida et al. |
| 2007/0087933 | A1 | 4/2007 | Purta et al. |
| 2007/0202335 | A1 | 8/2007 | Kubota |
| 2008/0233020 | A1 | 9/2008 | Purta et al. |
| 2008/0262114 | A1 | 10/2008 | Reynhout |
| 2008/0302703 | A1 | 12/2008 | Purta et al. |
| 2011/0119990 | A1 | 5/2011 | Venkataraman et al. |
| 2011/0119992 | A1 | 5/2011 | Pourarian et al. |
| 2012/0111768 | A1 | 5/2012 | Elsen |

FOREIGN PATENT DOCUMENTS

EP 1708297 A1 10/2006
EP 1946837 A2 7/2008

OTHER PUBLICATIONS

Nicholas E. Leadbeater, Rashid M. Khan, "Microwave-Promoted Desulfurization of Heavy and Sulfur-Containing Crude Oil," Energy & Fuels (2008), 22(3), 1836-1839 Abstract.
L. K. Heung, G. G. Wicks, "Silica embedded metal hydrides," Journal of Alloys and Compounds 293-295 (1999) pp. 446-451.
Visintin, A. et al., "Electrochemical activation and electrocatalytic enhancement of a hyride-forming metal alloy modified with palladium, platinum and nickel", Electrochimica Acta, 2006, pp. 3658-3667, vol. 51.

*Primary Examiner* — Edward Johnson
(74) *Attorney, Agent, or Firm* — Bruce M. Bordelon

(57) ABSTRACT

The present invention relates to new processes for regenerating oxidized interstitial metal hydride containing catalysts prior to the use of such catalysts in a hydroprocessing process. Interstitial metal hydride containing catalysts are easily oxidized in the environment and once oxidized, the hydroprocessing activity of the interstitial metal hydrides is most often severely diminished and this lost activity due to oxidization of the iMeH is not susceptible to recovery under hydroprocessing conditions. As a result, these catalysts in the present art require considerable special handling in inert environments all through processes from fabrication, shipping, loading, use, and maintenance of the catalyst systems to protect the activity of the interstitial metal hydride components. The present invention embodies a process regenerating oxidized interstitial metal hydride containing catalysts prior to their use in a hydroprocessing environment, thereby eliminating the requirement for maintaining the interstitial metal hydride containing catalysts in an inert environment, and allowing the handling of such catalysts in an oxidized condition prior to use.

24 Claims, 5 Drawing Sheets

% Activity of the Oxidized iMeH Samples
as compared to the Non-Oxidized iMeH Samples % Activity Recovery of the Oxidized & Regenerated iMeH Samples as compared to the Non-Oxidized iMeH Samples % Activity Recovery of the Oxidized & Regenerated iMeH Samples
as compared to the Oxidized iMeH Samples

INTERSTITIAL METAL HYDRIDE CATALYST ACTIVITY REGENERATION PROCESS

This application claims the benefit of U.S. Provisional Application No. 61/281,950 filed Nov. 24, 2009.

FIELD OF THE INVENTION

The present invention relates to new processes for regenerating oxidized interstitial metal hydride containing catalysts prior to the use of such catalysts in a hydroprocessing process. The present invention embodies a process which allows the handling of the interstitial metal hydride containing catalysts in an oxidized condition, thereby eliminating the requirement for maintaining the catalyst in an inert environment, and then regenerating the catalysts prior to their use in a hydroprocessing environment.

DESCRIPTION OF RELATED ART

As the demand for hydrocarbon-based fuels has increased, the need for improved processes for desulfurizing hydrocarbon feedstreams has increased as well as the need for increasing the conversion of the heavy portions of these feedstreams into more valuable, lighter fuel products. These hydrocarbon feedstreams include, but are not limited to, whole and reduced petroleum crudes, shale oils, coal liquids, atmospheric and vacuum residua, asphaltenes, deasphalted oils, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, raffinates, biofuels, and mixtures thereof.

Hydrocarbon streams boiling above 430° F. (220° C.) often contain a considerable amount of large multi-ring hydrocarbon molecules and/or a conglomerated association of large molecules containing a large portion of the sulfur, nitrogen and metals present in the hydrocarbon stream. A significant portion of the sulfur contained in these heavy oils is in the form of heteroatoms in polycyclic aromatic molecules, comprised of sulfur compounds such as dibenzothiophenes, from which the sulfur is difficult to remove.

The high molecular weight, large multi-ring aromatic hydrocarbon molecules or associated heteroatom-containing (e.g., S, N, O) multi-ring hydrocarbon molecules in heavy oils are generally found in a solubility class of molecules termed as asphaltenes. A significant portion of the sulfur is contained within the structure of these asphaltenes or lower molecular weight polar molecules termed as "polars" or "resins". Due to the large aromatic structures of the asphaltenes, the contained sulfur can be refractory in nature and can be difficult to remove. In conventional refining processes, sulfur compounds are removed in refinement processes from various hydrocarbon streams by "cracking" the petroleum oils in the presence of a metal catalyst and hydrogen. These conventional refining processes for sulfur removal from hydrocarbon streams, by such names as "hydrodesulfurization" processes or "hydrocracking" processes, are well known in the industry. In these catalytic processes, the sulfur-containing hydrocarbon streams are contacted with catalysts containing hydrogenation metals, typically belonging to Groups 6, 8, 9 and 10 of the Periodic Table (based on the 1990 IUPAC system wherein the columns are numbered from 1 to 18) and in the presence of hydrogen at elevated temperatures and pressures to promote molecular cracking and heteroatom removal.

In these processes, the sulfur atoms in the hydrocarbon streams are exposed or separated from the oil and are able to react with hydrogen which is then liberated from the process typically in the form of a hydrogen sulfide gas. In these processes, nitrogen is also removed to some extent from the hydrocarbon streams (i.e., "denitrogenation") and metals (i.e., "demetalization") are also removed to some extent from the hydrocarbon streams. However, sometimes, nitrogen and/or metals are targeted for removal by "pre-processing" the hydrocarbon streams and removing a portion of the nitrogen and/or metals prior to contacting the hydrodesulfurization or hydrocracking catalysts. Additionally, in these processes, some of the larger hydrocarbon molecules are "cracked" into smaller hydrocarbon molecules. This is generally called "cracking" or "conversion" and is a significant part of many of these hydroprocessing processes as this converts heavier, low value petroleum streams, such as gas oils and resids, into higher value products such as transportation fuels, for example, gasolines, jet fuels, and diesels.

An alternative modification to conventional hydroprocessing has been proposed in U.S. Pat. Nos. 7,157,401 and 7,387,712 to Purta et al. In these processes, petroleum oils are contacted with interstitial metal hydride ("iMeH") catalysts under mild conditions for hydrogenation of molecules. In particular, these patents disclose three specific compositions of iMeHs disclosed as Cat 100 (or "$AT_5$ type"), CAT 200 (or "$A_2T_{14}B$ type") and CAT 300 (or "$A_2T$ type").

However, a major problem facing the use of the interstitial metal hydrides catalysts lies in the fact that these interstitial metal hydride containing catalysts are easily oxidized in the environment and once oxidized, the hydroprocessing activity of the interstitial metal hydrides is most often severely diminished and not susceptible to recovery under hydroprocessing conditions. This problem of oxidation of the iMeH catalysts is clearly identified in the U.S. Pat. Nos. 7,157,401 and 7,387,712 as well as the resulting necessity to the maintain these iMeH catalysts under inert environments prior to use in order to avoid the oxidation and deactivation of the catalysts. This oxidation occurs when interstitial metal hydrides are exposed to an oxidizing environment, such as an oxygen-containing atmosphere (including, but not limited to, both air and water), wherein it is believed that the interstitial metal catalysts develop a hard "oxide shell" which severely inhibits the monatomic hydrogen flow in and out of the iMeH lattice, which function is of critical to their importance as use as hydroprocessing catalysts or catalyst components. Once formed on the iMeH and/or in the iMeH lattice structure, this oxide shell significantly impedes hydrogen transfer into and out from the iMeH. Even under severe hydroprocessing conditions exceeding 200° C. and 400 psig, the effects of this oxidation are clearly seen.

As a result, the iMeH catalysts require considerable special handling in inert environments all through processes from fabrication, shipping, loading, use, and maintenance of the catalyst systems to protect the activity of the interstitial metal hydride components. These are all very labor extensive and costly steps in maintaining the catalyst under an inert environment through all of these steps from fabrication to use. Additionally, all of these steps involve some risk that the interstitial metal hydride can be exposed to oxygen or contaminated during these processes. There are also additional inherent significant safety risks to be considered when handling the iMeH catalysts under inert environments as the iMeH catalysts can be pyrophoric in nature wherein an inadvertent exposure of the iMeH catalyst to oxygen under improper conditions may result in combustion of the catalyst. Additionally, when working in and with inert atmospheres, there is always the possibility of asphyxiation of personnel if improperly exposed to the inert environment associated with the iMeH catalyst.

What is needed in the industry is a process for handling these iMeH catalysts that does not require such rigid and expensive methods for maintaining these catalysts under inert conditions as proposed in the prior art, as well as reduce or eliminate concerns about the pyrophoric nature of the iMeH catalysts during storage, transport and reactor loading.

SUMMARY OF THE INVENTION

The current invention embodies processes that allow for simple and facile catalyst transportation and effective hydroprocessing of a hydrocarbon-containing feedstream to produce a product stream with improved product qualities by utilizing catalysts containing interstitial metal hydrides ("iMeH"s) without the need for maintaining such catalysts under inert environments. In fact, the present invention actually allows the catalysts to be exposed to an oxidizing environment (such as air or water) and become oxidized. Not only does this process significantly remove the costs, contamination exposures, and personnel safety issues associated with the necessity of maintaining the iMeH catalysts under inert environments; but by allowing the iMeH catalyst to oxidize under an environment which can be controlled, the iMeH catalyst can be passivated wherein the possibly pyrophoric nature of the catalyst can be controlled, thus resulting in improved safety as well as reduced costs and ease of handling.

The process of the present invention involves processes for the reactivation of an oxidized iMeH catalyst. The present invention includes processes for regenerating an "oxidized" iMeH catalyst with a "pressure swing" technique, a "purge sweep" technique, or a combination thereof resulting in an increased hydroprocessing activity of the treated iMeH catalyst.

A preferred embodiment of the present invention is a pressure swing process for regenerating an interstitial metal hydride catalyst comprising the steps of:

a) contacting a catalyst comprised of an interstitial metal hydride with a regeneration gas at a pressure $P_1$;

b) lowering the pressure of the regeneration gas to a pressure $P_2$, wherein $P_2$ is less than $P_1$ to produce a regenerated catalyst;

c) contacting the regenerated catalyst with a hydrocarbon feedstream under hydroprocessing conditions of at least 200° C. and at least 400 psig in the presence of hydrogen; and d) recovering an upgraded reaction product stream.

In a more preferred embodiment of the pressure swing process, the regeneration gas is comprised of at least 90 mol % of hydrogen, nitrogen, argon, helium, methane, and combinations thereof. In an even more preferred embodiment of the pressure swing process, $P_1$ is from about 100 psig to about 3,000 psig, and $P_2$ is from about 15 psig to about 2,500 psig.

A preferred embodiment of the present invention is a purge sweep process for regenerating an interstitial metal hydride catalyst comprising the steps of:

a) contacting a bed of catalyst with a regeneration gas at a pressure $P_{sweep}$, wherein the catalyst is comprised of an interstitial metal hydride;

b) flowing the regeneration gas through the bed of catalyst for at least 50 equivalent volumes to produce a regenerated catalyst;

c) recovering the regeneration gas as a waste stream;

d) contacting the regenerated catalyst with a hydrocarbon feedstream under hydroprocessing conditions of at least 200° C. and at least 400 psig in the presence of hydrogen; and e) recovering an upgraded reaction product stream.

In a more preferred embodiment of the purge sweep process, the regeneration gas is comprised of at least 90 mol % of hydrogen, nitrogen, argon, helium, methane, and combinations thereof. In an even more preferred embodiment of the purge sweep process, the catalyst is subjected to at least 100 equivalent volumes of the regeneration gas in step b).

In another even more preferred embodiment of the purge sweep process, the regeneration gas is flowed through the bed of catalyst at an hourly space velocity of from about 1 to about 10,000 cubic meters per hour of regeneration gas per cubic meter of catalyst bed. In yet another preferred embodiment of the purge sweep process, the pressure $P_{sweep}$ is from about 100 psig to about 3,000 psig.

DETAILED DESCRIPTION OF THE INVENTION

Figure 1:
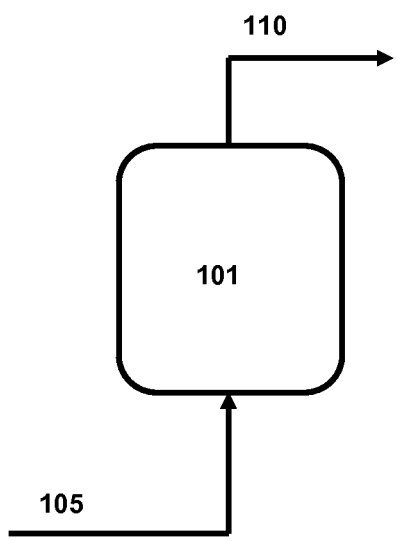
FIG. 1 is a simplified schematic of a preferred embodiment of the "purge sweep" iMeH catalyst regeneration process of the present invention.

The current invention embodies processes regenerating an oxidized interstitial metal hydride ("iMeH") containing catalyst or catalyst system in order to improve the hydroprocessing properties of the iMeH catalysts. After regeneration, these iMeH catalysts are preferably utilized in hydroprocessing a hydrocarbon-containing feedstream to produce a product stream with improved product qualities by the regenerated iMeH catalysts under high pressure/high severity conditions. These "improved product qualities" include, but or not limited to improved hydrogenation (or increased hydrogen content by weight), lower average boiling point conversion (or "cracking"), higher API gravity, reduced viscosity, desulfurization, denitrogenation, and demetalization.

A significant problem involving the use of the interstitial metal hydride containing catalysts lies in the fact that these interstitial metal hydride containing catalysts are easily oxidized in the environment and once oxidized, the hydroprocessing activity of the interstitial metal hydrides is most often severely diminished. Adding to the problem is that once oxidized, there are not known methods in the art for regenerating or recovering the activity of the oxidized iMeH catalysts. Even under high severity hydroprocessing conditions, once oxidized, the catalyst does not recover its hydroprocessing activity on its own.

This oxidation problem associated with iMeH catalysts is clearly identified in the U.S. Pat. Nos. 7,157,401 and 7,387,712, which are incorporated herein by reference, as well as the resulting necessity to maintain the iMeH catalysts under inert environments prior to use in hydroprocessing processes in order to avoid the deactivation of the iMeH catalysts. This oxidation occurs when interstitial metal hydrides are exposed to an oxidizing environment, such as an oxygen-containing atmosphere (including, but not limited to, both air and water), wherein it is believed that the interstitial metal catalysts develop a hard "oxide shell" which severely inhibits the monatomic hydrogen flow in and out of the iMeH lattice, which function is of critical to their importance as use as hydroprocessing catalysts or catalyst components. It is was also prior believed that the conversion of the iMeH into their surface metal oxide derivatives causes separation of the oxide components, which even if it is possible to reduce them back to the metals may now be segregated rather than in alloy form. Due to the nature of this reaction, once this oxide shell is formed it was believed that this reaction was not easily reversible, especially from a commercial standpoint, and therefore in order to maintain the necessary activity of these iMeH catalysts, maintenance in inert atmospheres has been required.

However, in the current invention simple, effective, and facile procedures for regenerating an oxidized iMeH catalyst to improve the iMeH activity to significantly above the oxidized iMeH activity level have been discovered. By this, it is meant that the parameter measured to determine the catalyst "activity" is the iMeH catalysts' hydroprocessing activity under equivalent conditions as measured by the first order rate constant of the process.

The first order rate constant is calculated by the formula:

First Order Rate Constant=space velocity×ln(reactant concentration in feed/reactant concentration in the product)

As utilized herein, the terms "interstitial metal hydride" or "iMeH" are equivalents and these terms as utilized herein are defined as materials that are composed of alloyed metals combined with atomic hydrogen, wherein the atomic hydrogen is stored interstitially within the metal alloy matrix.

The terms "interstitial metal hydride" or "iMeH", when used, are meant to refer solely to the iMeH component or components. The terms "iMeH catalysts" or "iMeH containing catalysts" as used herein are equivalents and are used as a generic term to cover any catalysts (including catalysts consisting of iMeH(s)), co-catalysts, or catalyst systems which are comprised of an iMeH component.

The processes of the present invention for regenerating interstitial metal hydrides catalysts and in particular the new iMeH hydroprocessing catalysts of the present invention have unexpectedly improved performance over the interstitial metal hydrides of the prior art particularly when the iMeH has undergone oxidation and even more particularly when the iMeH is exposed to severe hydroprocessing conditions after the regeneration processes of the present invention. The terms "high pressure/high severity" and "severe" hydroprocessing conditions and/or processes are equivalents as utilized herein and are defined as hydroprocessing processes wherein a hydrocarbon feedstream is contacted with a hydroprocessing catalyst in the presence of hydrogen at process conditions of at least 400 psig and at least 200° C.

It should be noted here that the terms "hydrocarbon-containing stream", "hydrocarbon stream" or "hydrocarbon feedstream" as used herein are equivalent and are defined as any stream containing at least 75 wt % hydrocarbons. These hydrocarbon feedstreams may be comprised of either "petroleum-based hydrocarbons", "biofuel hydrocarbons", or combinations thereof. The "petroleum-based hydrocarbons" are hydrocarbons obtained or derived hydrocarbonaceous materials from geological formations such as, but not limited to, crude oils, and oils derived from coal, tar sands, or bitumens, as well as any intermediate hydrocarbon or final hydrocarbon product derived from these sources. These are generally considered as non-renewable hydrocarbon sources.

As used herein, the terms "heavy hydrocarbon" or "heavy hydrocarbon stream" are equivalent and are defined herein as a subset of "petroleum-based hydrocarbons" and include hydrocarbon-containing streams containing at least 75 wt % hydrocarbons and having an API gravity of less than 20. Preferred heavy hydrocarbon streams for use in the present invention include, but are not limited to low API gravity, high sulfur, high viscosity crudes; tar sands bitumen; liquid hydrocarbons derived from tar sands bitumen, coal, or oil shale; as well as petrochemical refinery heavy intermediate fractions, such as atmospheric resids, vacuum resids, and other similar intermediate feedstreams and mixtures thereof containing boiling point materials above about 650° F. (343° C.). Heavy hydrocarbon streams may also include a blend of the hydrocarbons listed above with lighter hydrocarbon streams for control of certain properties for transport or sale, such as, but not limited to fuel oils and crude blends.

As used herein, the term "biofuel hydrocarbons" or "biofuels" are equivalent and are a sub-set of hydrocarbon streams, and are defined as hydrocarbon-containing streams wherein at least 50 wt % of the hydrocarbon material in the hydrocarbon-containing stream is derived from renewable biomass resources. These biomass resources include any plant or animal derived organic matter, such as dedicated energy crops and trees, agricultural food and feed crops, agricultural crop wastes and residues, wood wastes and residues, aquatic plants, algae, fungi, plant oils, animal oils, animal tissues, animal wastes, municipal wastes, and other waste materials. Biofuels may include, but are not limited to hydrocarbons in the middle distillate range, diesels, kerosenes, gasoline, gasoline fractions, biodiesel, biojet fuel, biogasolines and combinations thereof.

As used herein, the term "plant oil" is a subset of biofuels and is defined as a hydrocarbon-containing material derived from plant sources, such as agricultural crops and forest products, as well as wastes, effluents and residues from the processing of such materials. Plant oils may include vegetable oils. Examples of plant oils may include, but are not limited to, canola oil, sunflower oil, soybean oil, rapeseed oil, mustard seed oil, palm oil, corn oil, soya oil, linseed oil, peanut oil, coconut oil, corn oil, olive oil, and combinations thereof.

As used herein, the term "animal oil" is a subset of biofuels and is defined as a hydrocarbon-containing material derived animal sources, as well as wastes, effluents and residues from the processing of such materials. Examples of animal oils may include, but are not limited to, animal fats, yellow grease, animal tallow, pork fats, pork oils, chicken fats, chicken oils, mutton fats, mutton oils, beef fats, beef oils, and combinations thereof.

In the regeneration processes of the current invention, it has been discovered that the activity of an oxidized iMeH catalyst can be restored by several methods involving contacting the oxidized iMeH with a regeneration gas wherein it is believed that at least a portion, and preferably substantially all, of the iMeH's oxide layer is removed thereby recovering at least a portion of the iMeH activity prior to oxidation. In a most preferred embodiment, the oxide layer is removed by the regeneration process to an extent to wherein the hydroprocessing activity of the "regenerated iMeH" is substantially equal to the hydroprocessing activity of the "un-oxidized iMeH". The term "regenerated iMeH" as used herein is defined as an iMeH which has been exposed to an oxygen-containing source (and thus oxidized) which then undergoes at least one regenerating process of the present invention. The terms "non-oxidized" or "un-oxidized" as used in reference the iMeHs herein are equivalents and are defined as an iMeH which has not been exposed to an oxygen-containing source.

It should be noted that the iMeH catalysts can be regenerated by a process embodiment of the present invention at any point of the iMeH "cycle" of fabrication, transportation, loading, etc., as long as the resulting regenerated iMeH catalyst is then maintained under substantially non-oxidizing conditions until put under hydroprocessing conditions. However, most preferably, the greatest benefit of the current invention is achieved by regenerating the oxidized iMeH catalyst after loading of the hydroprocessing reactor(s) with the catalyst. In this manner, the oxidized catalyst can be handled in a non-oxidizing atmosphere up to the point of use. Additionally, the facilities necessary for regenerating the oxidized iMeH catalyst can easily be incorporated into the associated reactor hardware.

It has been discovered that the oxidized iMeH catalyst can be regenerated by a contacting the oxidized iMeH catalyst with a regeneration gas, as defined herein, to remove the oxide layer from the oxidized iMeH catalyst. Preferred regeneration gases are hydrogen, nitrogen, argon, helium, and methane. The iMeH regeneration process herein can either be done by a "purge sweep" wherein the regeneration gas is flowed over the oxidized iMeH catalyst or by a "pressure swing" wherein the oxidized iMeH catalyst is subjected to the regeneration gas environment at a superatmospheric pressure, $P_1$, followed by a subsequent lowering of the pressure of the inert gas environment to a pressure of $P_2$, wherein $P_2$ is less than $P_1$. In preferred embodiments of these processes, these pressurization/depressurization procedures or "cycles" are repeated a total of at least two times (i.e., at least two "cycles"). Additionally, in preferred embodiments of the present invention the "purge sweep" is maintained for a certain minimum amount of sweep time, and the "pressure swing" is maintained for a certain minimum amount of time at an elevated pressure (i.e., $P_1$) prior to depressurizing to a lower pressure, $P_2$. These times and levels will depend upon the particular iMeH catalyst utilized and possibly in part by the particular hydroprocessing process and process conditions in which the iMeH catalyst is utilized. With the invention disclosed herein, these optimum parameters can be selected by one of skill in the art to best be utilized with a particular iMeH catalyst and process configuration.

FIG. 1 herein is a simplified process schematic of an embodiment of the "purge sweep" regeneration process herein. Here, an iMeH catalyst is located in a vessel (101). While the regeneration process can be performed at any step in the fabrication, transportation, or reactor loading process, with any vessel necessary to support the catalyst and the "purge sweep" regeneration process streams and conditions, in a most preferred embodiment, the vessel (101) is a hydroprocessing reactor vessel in which the iMeH catalyst will be later subjected to hydroprocessing conditions. In this preferred embodiment, the necessary streams and arrangement as shown in FIG. 1 herein are incorporated into the hydroprocessing reactor vessel so that the iMeH catalyst does not need to be moved from the vessel after regeneration, and thereby maximizing the time/steps wherein the iMeH catalyst is in the oxidized condition and minimizing the exposure after regeneration to an oxidizing atmosphere prior to use of the regenerated iMeH catalyst in the hydroprocessing reaction.

Continuing with FIG. 1, a regeneration gas feedstream (105) is flowed into the vessel (101) wherein contacts the iMeH catalyst under purge conditions. By the term "regeneration gas feedstream", it is meant that the feedstream contains at least 90 mol % of regeneration gases. Preferably, the regeneration gas feedstream contains at least 99 mol % of regeneration gases. "Regeneration gases" are defined herein as those gases, or combination of gases, which do not, in themselves, promote conversion of the iMeH to other substances (i.e., oxides, sulfides, nitrides, or carbides) under the pressure and temperature conditions of the regeneration process. Preferred regeneration gases for use in the process of invention herein are hydrogen, nitrogen, argon, helium, methane, and combinations thereof.

In preferred embodiments, the regeneration gas flows through the catalyst bed at a pressure $P_{sweep}$ from about 100 to about 3,000 psig (740 to 20,786 kPa). The regeneration gas feedstream flows through the iMeH catalyst in vessel (101) and leaves the vessel as a purge gas outlet stream (110). In preferred embodiments, the regeneration gas feedstream (105) inlet and the purge gas outlet stream (110) outlet nozzles are located so as to maximize the contact between the regeneration gas feedstream and the iMeH catalyst. Multiple nozzle configurations and internal distributors may also be utilized in vessel (101) to improve contact. Preferred conditions for the regeneration gas feedstream through the vessel (101) are temperatures in the range from about 25° C. to about 500° C., more preferably from about 100° C. to about 500° C., at pressures in the range from about 100 to about 3,000 psig (740 to 20,786 kPa), more preferably from about 100 to about 2,000 psig (740 to 13,891 kPa).

In preferred embodiments of the present purge sweep regeneration process, the catalyst is subjected to at least 50 equivalent volumes, more preferably at least 100 equivalent volumes, and even more preferably at least 200 equivalent volumes of the regeneration gas stream during the regeneration process. One equivalent volume of the regeneration gas is defined as the volume of regeneration gas under the average pressure under which the purge sweep regeneration is performed that corresponds to the contained volume of the catalyst bed. In other preferred embodiments of the present purge sweep regeneration process, the regeneration gas is flowed through the bed of catalyst at an hourly space velocity of from about 1 to about 10,000 cubic meters per hour of regeneration gas per cubic meter of catalyst bed.

Figure 2:
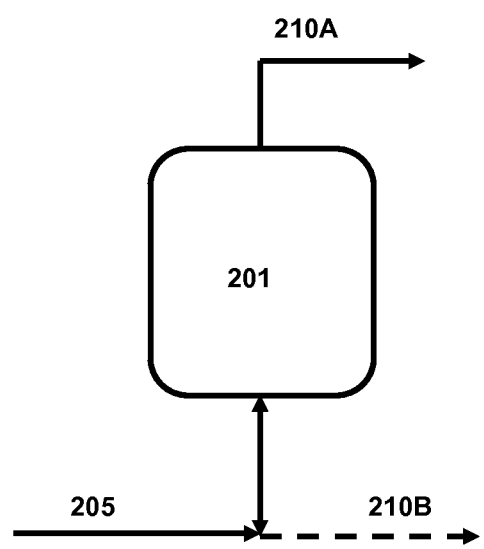
FIG. 2 is a simplified schematic of a preferred embodiment of the "pressure swing" iMeH catalyst regeneration process of the present invention.

FIG. 2 herein is a simplified process schematic of an embodiment of the "pressure swing" regeneration process herein. The basic flow configuration of this embodiment is similar to the "purge sweep" configuration of FIG. 1. In FIG. 2, an iMeH catalyst is located in a vessel (201). Similar to the configuration of FIG. 1, the vessel (201) can be located in any step of the fabrication, transportation, or reactor loading process, but is most preferably the same hydroprocessing reactor vessel in which the iMeH catalyst will be later subjected to hydroprocessing conditions after the regeneration, with the necessary streams configurations and associated equipment included therein.

Continuing with FIG. 2, a regeneration gas feedstream (205) is pressured into the vessel (201) wherein contacts the iMeH catalyst. In this embodiment, regeneration gas feedstream (205) in maintained in the vessel (201) and raised to a first pressure, $P_1$. The pressure of the regeneration gas feedstream is then maintained under pressure, $P_1$, for a duration of time, $t_1$. In preferred embodiments, $P_1$ is from about 100 psig to about 3,000 psig, more preferably from about 200 to about 2,000 psig. It should also be noted that the pressure, P, in vessel (201) may be raised and or lowered in steps and maintained for periods of time, t. In a preferred embodiment, the vessel (201) is held at a pressure $P_1$, for a time $t_1$ from about 5 to about 300 minutes, more preferably from about 15 to about 120 minutes prior to depressurizing. The regeneration gas feedstream is then depressurized from the vessel as a pressurization gas outlet stream (210A or 210B). As shown in FIG. 2, in a preferred embodiment, the depressurized gas flows from the reactor through a stream as designated as (210A) such that the regeneration gas must move through the iMeH catalyst to exit the vessel. However, alternatively, the pressurization gas outlet stream can be depressurized through the same nozzle (or a similarly located nozzle) as shown designated as (210B) in FIG. 2.

When utilizing the "pressure swing" regeneration embodiment herein, it is preferred if the difference between the highest pressure experienced during at least one pressurization cycle, $P_H$, and the lowest pressure experienced during at least one pressurization cycle, $P_L$, is at least 100 psig, and more preferably, at least 200 psig. In other preferred embodiments, the pressure during the regeneration process or within any cycle of the regeneration process may be raised or lowered in "steps", wherein a certain pressure level is held at a given pressure for some time before raising or lowering the pressure to another step.

It should also be noted that the choice of using the "purge sweep" embodiment or the "pressure swing" embodiment will most likely depend on the configuration of the regeneration facilities as well as the particular iMeH catalyst configuration and the necessary activity recovery levels required to be achieved. For instance, in a process where it is easy to flow the regeneration gas across the iMeH catalyst bed, the "purge sweep" embodiment may be preferred. Where a steady flow may not be easily achieved (for instance where compressor capacity is limited), the "pressure swing" embodiment may likely be the preferred operational regeneration embodiment. The "purge sweep" embodiment may also be preferred where it is desired to elevate the temperature of the iMeH catalyst with a heated regeneration gas system during the purge sweep process to improve the reactivation of the iMeH catalyst. The "purge sweep" procedures and the "pressure swing" procedures herein may also be combined in a regeneration process to maximize effectiveness.

It should be noted that while it is obvious to one of skill in the art that a non-oxidizing environment can keep the iMeH catalyst from being oxidized and therefore retain its activity, it is not obvious, even to the inventors herein, as to why these iMeH catalysts react to the current procedures for regeneration in the presence of a regeneration gas as disclosed herein. While not wishing to be held to any specific theory, it is believed that these "purge sweep" and "pressure swing" procedures may erode or even crack the oxide shell on the iMeHs themselves, allowing the iMeH to again pass the monatomic hydrogen between its surface and its interior lattice structure. It is also believed that the "pressure swing" process embodiment is in general more effective than the "purge sweep" process embodiment, especially when the pressures exerted during the regeneration process are such that there is an overall differential in pressure of at least 100 psig, and even more preferably at least 200 psig experienced between the highest pressure, $P_H$, and lowest pressure, $P_L$, that the catalyst is subjected to during the overall regeneration process. Additionally, it is believed that the purge sweep embodiment is more effective when the sweep gas is at an elevated temperature of at least 100° C.

Example 1 herein describes how the iMeH catalysts used to test an embodiment of the regeneration process invention herein were fabricated. The representative iMeHs utilized in Examples 1 and 2 herein include iMeHs of the prior art (CAT 100, CAT 200, and CAT 300) which are disclosed in U.S. Pat. Nos. 7,157,401 and 7,387,712, which are incorporated herein by reference, as well as a new iMeH formulation (CAT 400) which composition is the subject of a co-pending patent application.

In Example 2 herein, the iMeH catalysts were tested under similar conditions wherein each iMeH was subjected to similar hydroprocessing conditions in a non-oxidized catalyst condition. From the test results, the relative first order rate constants were calculated for each of the four (4) non-oxidized iMeHs for three (3) different model feed compounds. The three model feed compounds were dibenzothiophene, diethyl-dibenzothiophene (4,6-diethyl-dibenzothiophene), and dodecyl-naphthalene (1-n-dodecylnaphthalene). Similarly, the four (4) iMeHs were tested under the same hydroprocessing conditions for the three (3) different model feed compounds, after being oxidized. Finally in Example 2, the four (4) iMeHs were tested under the same hydroprocessing conditions for the three (3) different model feed compounds, after being oxidized and regenerated per an embodiment of the regeneration process of the present invention. The first order rate constant was calculated for each test for each of the three (3) model compounds and used as a measure of each samples hydroprocessing activity.

The "% Activity After Oxidation" of the four (4) sample interstitial metal hydrides ("iMeH"s) showing the drop in hydroprocessing activity experienced after oxidation of the iMeHs as compared to the same non-oxidized iMeH samples from the testing of Example 2 is shown in Table 1 herein for each of the model compounds. The "% Activity After Oxidation" is based on a ratio of each iMeH's first order rate constant after oxidation (but without regeneration) divided by the iMeH's first order rate constant prior to oxidation (expressed in percentage, %) for each of the three model compounds tested, as per the procedures of Example 2.

TABLE 1

% Activity after Oxidation (%)
(at 400 psig and 200° C.)

| iMeH Catalyst ID | % Activity After Oxidation (dibenzothiophene) | % Activity After Oxidation (diethyl-dibenzothiophene) | % Activity After Oxidation (dodecyl-naphthalene) |
|---|---|---|---|
| CAT 100 (prior art iMeH) | 70.3 | 66.7 | 133.3 |
| CAT 200 (prior art iMeH) | 33.3 | 100.0 | 40.0 |
| CAT 300 (prior art iMeH) | 15.7 | 20.0 | 33.3 |
| CAT 400 (new iMeH) | 12.5 | 16.7 | 2.0 |

Figure 3:
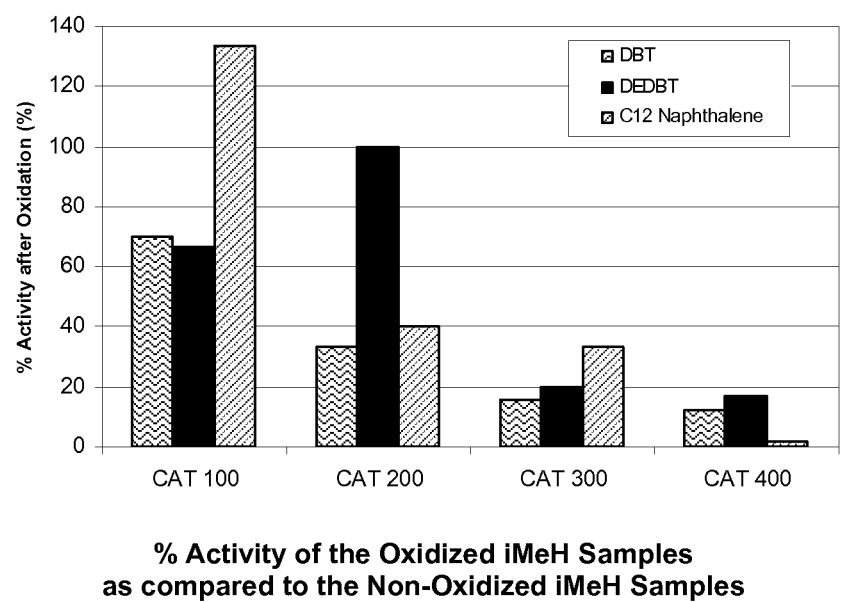
FIG. 3 is a graph comparing the "% Activity After Oxidation" of four (4) sample interstitial metal hydrides ("iMeH"s) showing the drop in hydroprocessing activity experienced after oxidation of the iMeHs as compared to the same non-oxidized iMeH sample. The % Activity After Oxidation is based on a ratio of each iMeH's first order rate constant after oxidation (but without regeneration) divided by the iMeH's first order rate constant prior to oxidation (expressed in percentage, %) for each of the three model compounds tested, as per the procedures of Example 2. The representative iMeHs in this figure include iMeHs of the prior art (CAT 100, CAT 200, and CAT 300), in addition to a new iMeH formulation (CAT 400) which composition is the subject of a co-pending patent application.

The data from Table 1 is also shown graphically in FIG. 3. As can be seen in general, but to differing extents, the activity of all of the iMeHs, for most if not all of the model compounds tested, were detrimentally affected by oxidation. That is to say that for most of the iMeHs and model compounds tested, the % activity of the iMeH after oxidation was less than 100%. This is consistent with the concerns and views as stated in the prior art that the iMeHs, when oxidized, exhibit losses (sometimes severe), in their hydroprocessing activity.

Continuing with the results from the testing in Example 2 herein, the "% Activity Recovery over Non-Oxidized Samples" of the four (4) sample interstitial metal hydrides ("iMeH"s) after an embodiment of the regeneration process disclosed herein as compared to the same interstitial metal hydrides prior to oxidation from the testing of Example 2 is shown in Table 2 herein. The "% Activity Recovery over Non-Oxidized Samples" by the present invention is based on a ratio of each iMeH's first order rate constant after oxidation & regeneration divided by the iMeH's first order rate constant prior to oxidation (expressed in percentage, %) for each of the three model compounds tested, as per the procedures of Example 2.

manner as the "% Activity Recovery over Non-Oxidized Samples", above) is at least 25% as measured under hydroprocessing conditions of 200° C. and 400 psig for at least one model compound selected from dibenzothiophene, diethyl-dibenzothiophene (4,6-diethyl-dibenzothiophene), and dodecyl-naphthalene (1-n-dodecylnaphthalene). In another preferred embodiment of the present, the regeneration process increases the % activity recovery of the regenerated iMeH over the non-oxidized iMeH is at least 50% as measured under hydroprocessing conditions of 200° C. and 400 psig for at least one model compound selected from dibenzothiophene, diethyl-dibenzothiophene (4,6-diethyl-dibenzothiophene), and dodecyl-naphthalene (1-n-dodecylnaphthalene). In yet another preferred embodiment of the present, the regeneration process increases the % activity recovery of the regenerated iMeH over the non-oxidized iMeH is at least 75% as measured under hydroprocessing conditions of 200° C. and 400 psig for at least one model compound selected from dibenzothiophene, diethyl-dibenzothiophene (4,6-diethyl-dibenzothiophene), and dodecyl-naphthalene (1-n-dodecylnaphthalene).

TABLE 2

% Activity Recovery over Non-Oxidized Samples (%)
(at 400 psig and 200° C.)

| iMeH Catalyst ID | % Activity Recovery over Non-Oxidized Samples (dibenzothiophene) | % Activity Recovery over Non-Oxidized Samples (diethyl-dibenzothiophene) | % Activity Recovery over Non-Oxidized Samples (dodecyl-naphthalene) |
|---|---|---|---|
| CAT 100 (prior art iMeH) | 83.8 | 33.3 | 33.3 |
| CAT 200 (prior art iMeH) | 83.3 | 50.0 | 100.0 |
| CAT 300 (prior art iMeH) | 29.4 | 80.0 | 133.3 |
| CAT 400 (new iMeH) | 77.5 | 25.0 | 34.7 |

Figure 4:
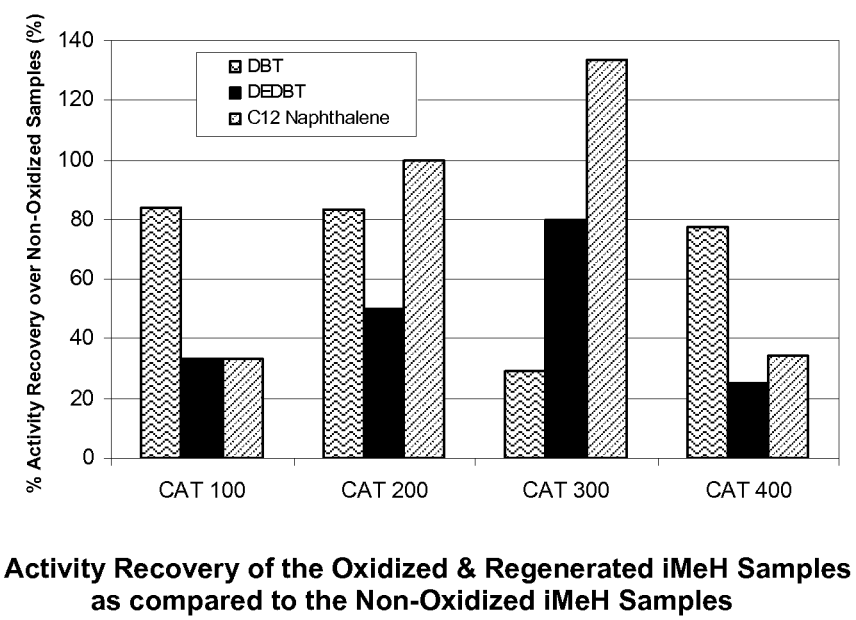
FIG. 4 is a graph comparing the "% Activity Recovery over Non-Oxidized Samples" of four (4) sample interstitial metal hydrides ("iMeH"s) after an embodiment of the regeneration process disclosed herein as compared to the same interstitial metal hydrides prior to oxidation. The % Activity Recovery over Non-Oxidized Samples by the present invention is based on a ratio of each iMeH's first order rate constant after oxidation & regeneration divided by the iMeH's first order rate constant prior to oxidation (expressed in percentage, %) for each of the three model compounds tested, as per the procedures of Example 2. The representative iMeHs in this figure include iMeHs of the prior art (CAT 100, CAT 200, and CAT 300), in addition to a new iMeH formulation (CAT 400) which composition is the subject of a co-pending patent application.

The data from Table 2 is also shown graphically in FIG. 4. As can be seen in general, after the oxidized iMeH samples were subjected to an embodiment of the regeneration process herein, the samples recovered a significant percentage of hydroprocessing activity as compared to their non-oxidized state. In general, all of the iMeH hydrides experienced at least a 25% activity recovery for at least one of the model compounds tested. In general, these average activity recoveries were greater than 50%, and in some cases the activity recoveries were greater than 75% for at least one of the model compounds, showing a surprising and unexpected effect of the current process invention.

In preferred embodiment of the present, the regeneration process increases the % activity recovery of the regenerated iMeH over the non-oxidized iMeH (calculated in the same Another way of showing the hydroprocessing activity improvement experienced through use of the process of the present invention, is shown in Table 3 in the "% Activity Recovery over Oxidized Samples" of four (4) sample interstitial metal hydrides ("iMeH"s). Here, the activities of the iMeHs after being subjected to an embodiment of the regeneration process disclosed herein are compared to the activities of the same interstitial metal hydrides after oxidation but prior to regeneration. As such, the "% Activity Recovery over Oxidized Samples" by the present invention is based on a ratio of each iMeH's first order rate constant after oxidation & regeneration divided by the iMeH's first order rate constant after oxidation, but prior to regeneration (expressed in percentage, %) for each of the three model compounds tested, as per the procedures of Example 2. The data as presented in Table 3

(and accompanying FIG. 5), clearly shows that the regeneration processes of the present invention can be utilized to recovery hydroprocessing activity that has been lost due to oxidation effects.

TABLE 3

% Activity Recovery over Oxidized Samples (%)
(at 400 psig and 200° C.)

| iMeH Catalyst ID | % Activity Recovery over Oxidized Samples (dibenzothiophene) | % Activity Recovery over Oxidized Samples (diethyl-dibenzothiophene) | % Activity Recovery over Oxidized Samples (dodecyl-naphthalene) |
|---|---|---|---|
| CAT 100 (prior art iMeH) | 119.2 | 50.0 | 25.0 |
| CAT 200 (prior art iMeH) | 250.0 | 50.0 | 250.0 |
| CAT 300 (prior art iMeH) | 187.5 | 400.0 | 400.0 |
| CAT 400 (new iMeH) | 620.0 | 150.0 | 1700.0 |

Figure 5:
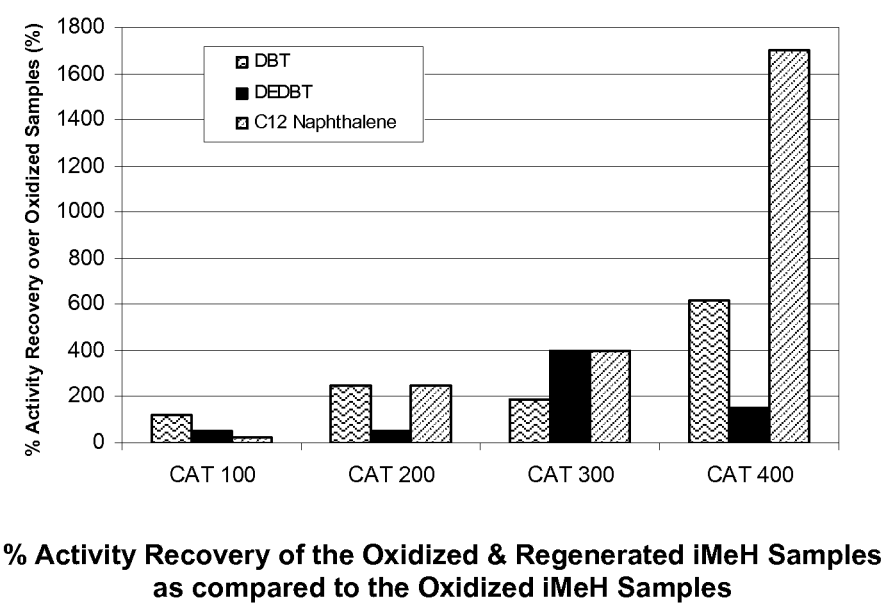
FIG. 5 is a graph comparing the "% Activity Recovery over Oxidized Samples" of four (4) sample interstitial metal hydrides ("iMeH"s) after an embodiment of the regeneration process disclosed herein as compared to the same interstitial metal hydrides after oxidation but prior to regeneration. The % Activity Recovery over Oxidized Samples by the present invention is based on a ratio of each iMeH's first order rate constant after oxidation & regeneration divided by the iMeH's first order rate constant after oxidation, but prior to regeneration (expressed in percentage, %) for each of the three model compounds tested, as per the procedures of Example 2. The representative iMeHs in this figure include iMeHs of the prior art (CAT 100, CAT 200, and CAT 300), in addition to a new iMeH formulation (CAT 400) which composition is the subject of a co-pending patent application.

As can be seen in general in Table 3 and accompanying FIG. 5, after the oxidized iMeH samples were subjected to an embodiment of the regeneration process herein, the samples recovered a significant percentage of their hydroprocessing activity as compared to their oxidized state. In general, all of the iMeH hydrides experienced at least some activity recovery for at least one of the model compounds tested. In most of these, the iMeH hydrides experienced an activity recovery of at least 200% as compared to the oxidized sample for at least one of the model compounds tested. In at least two (2) of the iMeH samples tested, these average activity recoveries were greater than 300% as compared to the oxidized sample, and in some cases the activity recoveries were greater than 500% as compared to the oxidized sample for at least one of the model compounds, again showing a surprising and unexpected effect of the current process invention.

In preferred embodiment of the present, the regeneration process increases the % activity recovery of the regenerated iMeH over the oxidized iMeH (calculated in the same manner as the "% Activity Recovery over Oxidized Samples", above) is at least 200% as measured under hydroprocessing conditions of 200° C. and 400 psig for at least one model compound selected from dibenzothiophene, diethyl-dibenzothiophene (4,6-diethyl-dibenzothiophene), and dodecyl-naphthalene (1-n-dodecylnaphthalene). In another preferred embodiment of the present, the regeneration process increases the % activity recovery of the regenerated iMeH over the oxidized iMeH is at least 300% as measured under hydroprocessing conditions of 200° C. and 400 psig for at least one model compound selected from dibenzothiophene, diethyl-dibenzothiophene (4,6-diethyl-dibenzothiophene), and dodecyl-naphthalene (1-n-dodecylnaphthalene). In yet another preferred embodiment of the present, the regeneration process increases the % activity recovery of the regenerated iMeH over the oxidized iMeH is at least 500% as measured under hydroprocessing conditions of 200° C. and 400 psig for at least one model compound selected from dibenzothiophene, diethyl-dibenzothiophene (4,6-diethyl-dibenzothiophene), and dodecyl-naphthalene (1-n-dodecylnaphthalene).

The iMeH catalysts, when regenerated according to the regeneration procedures herein, are particularly beneficial when utilized in the hydroprocessing of hydrocarbon streams, particularly at the high temperatures (above 200° C.) and high pressures (above 400 psig) associated with most commercial hydroprocessing processes. These iMeH catalysts, after regeneration according to the present invention, display significantly improved hydroprocessing activity under these severe hydroprocessing conditions as compared to the same iMeH catalysts that have been exposed to an oxidizing environment.

The regenerated iMeHs can be utilized by themselves as an active catalyst or as a co-catalyst with additional catalytic materials. By the term "co-catalyst" as used herein, it is meant that the iMeH component is either made into a catalyst particle along with other catalytic elements(s), or alternatively, one catalyst particle can be comprised of the iMeH component and mixed with a separate catalyst particle comprised of the catalytic elements(s). Preferred catalytic elements include, but are not limited to Group 6, 8, 9 and 10 elements. More preferred catalytic elements for use with the regenerated iMeHs of the present invention are Mo, W, Fe, Co, Ni, Pd, Pt, and combinations thereof. The even more preferred catalytic elements for use with the iMeHs of the present invention are Mo, W, Co, Ni, and combinations thereof. In a most preferred embodiment, the co-catalyst is comprised of a regenerated iMeH and Mo. In another most preferred embodiment, the co-catalyst is comprised of a regenerated iMeH, Mo, and either Co, Ni or a combination thereof. In the present invention, the "co-catalyst" systems are a preferred embodiment.

The regenerated iMeHs of the present invention are preferably utilized at the high temperatures and pressures at which most commercial hydroprocessing processes operate. In particular these processes include, but are not limited to, hydrogenation, hydrocracking, hydrodesulfurization, hydrodenitrogenation, and hydrodemetalization processes. The iMeH metals can absorb and release hydrogen in its monatomic state which is more reactive with the hydrocarbons in the process than the diatomic hydrogen typically present in the processes. However, when the monatomic hydrogen is released from the iMeH surface, it is also highly reactive with other monatomic hydrogen in the system. Therefore, it is desired that the additional catalytic elements in the co-catalyst be located in very close proximity to the iMeH to allow the monatomic hydrogen released to react at the active catalytic sites with the hydrocarbon molecules or heteroatoms (such as sulfur, nitrogen, and metals) in the hydrocarbons to form molecular heteroatom compounds (e.g., hydrogen sulfide) that can be easily removed from the hydroprocessed product stream.

The iMeHs can be combined with known hydroprocessing catalysts such as noble metals, metal oxides, metal sulfides, zeolitic acid or base sites to further promote hydroprocessing of feedstocks such as organic compounds. These iMeH materials can be combined with other hydroprocessing materials in a variety of ways to build an optimized catalyst for a particular reaction or function. In general, the finer the powders being mixed (e.g. support, iMeH), the higher the surface area and the more intimate the mixing.

The iMeH catalyst can be used in a powder, extrudate, or preformed matrix form based upon the type of reactor design selected (e.g., fluidized bed, fixed bed, catalytic converter, etc.). The simplest iMeH catalyst is the iMeH powder itself. In this case the iMeH provides monatomic hydrogen and is the catalyst for hydroprocessing. The iMeH catalysts of the present invention, when used in powder form, may be mixed and dispersed within the feedstock and transported through a reactor (e.g. slurry reactor). After the desired reaction has been catalyzed in the reactor, the iMeH powder can then separated from the reaction products for reuse.

The iMeH can be combined with a support and optionally other catalytic elements to produce a composite catalyst. The support provides for the physical dispersion of iMeH, providing greater surface area and ease of handling. The support also serves to increase the surface area of the active catalytic elements and thereby increase the process reaction rates. The support also can add acidic or basic sites that can enhance the catalytic activity of other catalyst components or act as catalysts themselves. The support also serves to disperse the metallic or metal oxide catalytic sites so as to prevent arcing in the presence of a strong electric or magnetic fields that may be used to expedite catalytic action. The catalyst may further comprise a radio frequency or microwave absorber in thermal contact with the interstitial metal hydride. These absorbers are preferably added metal elements or metal compounds with a high dielectric constant.

The iMeHs can be utilized in a crystalline or amorphous form. The support may be composed of an inorganic oxide, a metal, a carbon, or combinations of these materials. In preferred embodiments of the present invention, the support is comprised of alumina, silica, titania, zirconia, MCM-41 or combinations thereof. The iMeH phases and catalytic elements can be dispersed as mechanically mixed powders, or can be chemically dispersed, impregnated or deposited. When mixed powders are used in the present invention, the powder particle size is controlled to provide a powder that has particles that are small enough to provide suitable surface area and reactivity, but not so fine as to produce significant surface oxidation. Other catalytic elements included in the co-catalyst or catalyst systems of the present invention may be noble metals such as platinum or palladium, Group 6, 8, 9 and 10 metal oxides and/or metal sulfides, and zeolite acid or base sites. A hydroprocessing component and a hydrocracking component used in combination with the iMeH may be one or more of these catalytic elements. Both the combination of an iMeH powder with a support, which can provide an additional catalyst function (i.e. at catalytically active or inert support), or an iMeH dispersed onto a hydroprocessing catalytic powder, can be especially effective for hydrocracking in an FCC type of fluidized bed reactor.

The iMeH is especially suited to accommodating monatomic hydrogen extracted from molecular hydrogen. The quantity of atomic hydrogen in the interstitial metallic hydrides has a measurable value, which is a function of alloy composition, and operating temperature and hydrogen partial pressure. In an iMeH, the ratio of hydrogen to metal atoms may vary over a range and may not be expressible as a ratio of small whole numbers. The iMeH compounds of the present invention are able to dissociate diatomic hydrogen molecules at the surface into monatomic hydrogen, absorb copious amounts of monatomic hydrogen thus produced into the metal alloy, and desorb the monatomic hydrogen under the appropriate conditions. A heat of absorption is produced when the molecular hydrogen dissociates into atomic hydrogen and the hydrogen atoms position themselves interstitially in the structure of the material. Additional energy at a suitable steady state process temperature and pressure is required for the release of monatomic hydrogen from within the catalyst. This energy can be derived from the process heat of reaction or from external application of energy or both.

Interstitial metal hydrides are produced by preparing samples of the constituent metals in the desired proportions, and combining them and heating them so that they melt together homogeneously to produce a metal alloy. The resulting metal alloy is then exposed to hydrogen at a temperature and pressure characteristic of the alloy so that the metal alloy takes up the hydrogen in monatomic form.

The metal alloy from which an iMeH is produced can be prepared by mechanical or induction heated alloying processes. The metal alloy can be stoichiometric or hyper-stoichiometric. Hyper-stoichiometric compounds are compounds that exhibit wide compositional variations from ideal stoichiometry. Hyper-stoichiometric systems contain excess elements, which can significantly influence the phase stability of the metallic hydrides. The iMeH is produced from a metal alloy by subjecting the alloy to hydrogen at a pressure and temperature that is a characteristic of the particular alloy.

It has been of utmost importance in the prior art that the iMeH catalysts be limited in its exposure to either air and/or water as the iMeH is prone to forming a strong oxide layer when exposed to oxygen sources. This oxide layer can create a significant barrier on the iMeH surface which limits the transfer of monatomic hydrogen between the feed environment and the iMeH crystal lattice which is not easily removable by methods known in the art. However, as described herein, the present invention eliminates this need for limiting the exposure of the catalyst to oxidizing atmospheres through the invention of processes for regenerating the oxidized catalysts and specifically, the identification of new iMeH catalyst systems which are particularly responsive to this regeneration technique and posses a superior level of hydroprocessing activity.

In a preferred embodiment of the present invention, a hydrocarbon stream and/or the heavy hydrocarbon stream containing at least 1 wt % sulfur and more preferably at least 3 wt % sulfur is contacted with a catalyst, co-catalyst, or catalyst system containing a regenerated iMeH in the presence of hydrogen at a temperature of at least 200° C. and 400 psig. In other preferred embodiments of the present invention, the hydrocarbon stream and/or the heavy hydrocarbon stream that is desulfurized in the present process contains polycyclic sulfur heteroatom complexes which are difficult to desulfurize by conventional methods.

In a more preferred process embodiment, the hydroprocessing conditions are at least 400 psig and at least 200° C. and the regenerated iMeH is used in a co-catalyst with at least one catalytic element selected from Mo, W, Fe, Co, Ni, Pd, Pt, as well as combinations thereof. In a more preferred embodiment, the regenerated iMeH is used in a co-catalyst with at least one catalytic element selected from Mo, W, Co, Ni, as well as combinations thereof. In an even more preferred embodiment, the regenerated iMeH is used in a co-catalyst with Mo, and either Co, Ni or a combination thereof.

In preferred processes the regenerated iMeH catalysts herein are utilized in hydroprocessing processes wherein the iMeH catalysts are contacted with a hydrocarbon stream in a hydroprocessing reactor under reaction conditions comprising at least 200° C. and at least 400 psig. Preferred reaction conditions are at least 250° C. and at least 600 psig. Preferred hydrogen partial pressures are at least about 350 psia, and even more preferably at least about 500 psia. Most preferably the reaction conditions are about 200° C. to about 450° C. with an operating pressure of from about 400 psig to about 2,500 psig. A reaction product stream is typically then withdrawn from the hydroprocessing reactor. This reaction product stream will typically contain some gaseous hydrocarbon products and hydrogen. These gaseous products can be separated by processes known in the art and a hydrocarbon product stream with improved product qualities is retrieved. Additional process stages may be also be used in the process of the present invention to improve overall selectivity and conversion of the final hydrocarbon products.

Although not required for the use of the present invention, the catalytic activity of the iMeH containing catalysts can be enhanced and controlled by exposing the catalyst to radio frequency ("RF") energy (about $3 \times 10^5$ Hz to about $3 \times 10^8$ Hz) or microwave energy (about $3 \times 10^8$ Hz to about $3 \times 10^{12}$ Hz), either in the absence of, the presence of, or in sequence with conventional fuel fired heating or resistive heating. The RF or microwave energy can provide for a significant increase in hydroprocessing efficiency in comparison to conventional heating. Furthermore the microwave energy can be modulated and controlled in such a manner as to optimize the reaction exchange of the monatomic hydrogen from the iMeH. In one embodiment of the invention, the iMeH catalyst component is placed in contact with a separate absorber of RF or microwave energy. The separate absorber of RF or microwave energy absorbs the energy and transfers it to the iMeH through thermal conduction or convection, and may be one or more compounds such as silicon carbide, iron silicide, nickel oxide, and tungsten carbide. In another embodiment of the invention, the iMeH component functions as the primary absorber of RF or microwave energy. When used with microwave enhancement, the iMeH component is sufficiently dispersed within the catalyst and feedstock combination to solve the problem of hot spots and arcing generally associated with the introduction of metals into a microwave or RF field.

The selective use of RF or microwave energy to drive the catalytic component of the catalyst aids in the release of the iMeH monatomic hydrogen into the feedstock. It is cost effective to maximize the use of fossil fuels to pre-heat the feedstocks to near reaction temperatures, and use minimum RF or microwave energy to drive and control the hydroprocessing reactions. Ideally there will be a minimized or zero net temperature increase from the RF or microwave energy into the catalyst support or into the feedstock because this energy is primarily targeted into the iMeH to enhance the reaction exchange of monatomic hydrogen. Selective coupling of the RF or microwave energy is accomplished through selection and control of the relative dielectric parameters of the catalyst's components and the feedstock. This results in efficient, economically viable catalytic processes, which are enhanced using microwaves.

The regenerated iMeH catalysts, co-catalysts and catalyst systems of the present invention can be used in any hydroprocessing process. The term "hydroprocessing" (or equivalent term "hydrotreating") as used herein is a general term and is defined as all catalytic processes involving hydrogen. This includes the reaction of any petroleum fraction with hydrogen in the presence of a catalyst. This includes processes which remove undesirable impurities such as sulfur, nitrogen, metals, and unsaturated compounds in the presence of hydrogen and a catalyst. Examples include, but are not limited to, hydrogenation, hydrocracking, hydrodesulfurization, hydrodenitrogenation, hydrodemetalization, and catalytic hydrodewaxing.

Specific hydroprocessing processes wherein the iMeH catalysts, co-catalysts and catalyst systems of the present invention can be used include, but are not limited to the following processes as defined:

The term "hydrogenation" as used herein is defined as any process wherein a hydrocarbon feedstream is contacted with a catalyst and hydrogen at an elevated pressure and temperature wherein hydrogen is chemically added to at least a portion of the hydrocarbon compounds in the hydrocarbon feedstream, thereby increasing the hydrogen content of the hydrocarbon compounds. Preferred hydrogenation applications include the hydrogen addition to "unsaturated" olefinic or aromatic hydrocarbon compounds (e.g., olefin hydrogenation or aromatic hydrogenation). Hydrogenation is a subset of hydroprocessing processes.

The term "hydrocracking" as used herein is defined as any process wherein a hydrocarbon feedstream is contacted with a catalyst and hydrogen at an elevated pressure and temperature wherein at least a portion of the hydrocarbon feedstream is converted into lower-boiling point, higher-value products thereby resulting in an overall lower average boiling point product stream based on wt %. Hydrocracking is a subset of hydroprocessing processes.

The term "hydrodesulfurization" or "HDS" as used herein is defined as a process in which a hydrocarbon feedstream is contacted with a catalyst and hydrogen at an elevated pressure and temperature wherein at least a portion the sulfur elements or compounds present in hydrocarbon feedstream are removed thereby resulting in at least one hydrocarbon product with a lower sulfur content than the hydrocarbon feedstream. Hydrodesulfurization is a subset of hydroprocessing processes.

The term "hydrodenitrogenation" or "HDN" as used herein is defined as a process in which a hydrocarbon feedstream is contacted with a catalyst and hydrogen at an elevated pressure and temperature wherein at least a portion the nitrogen elements or compounds present in hydrocarbon feedstream are removed thereby resulting in at least one hydrocarbon product with a lower nitrogen content than the hydrocarbon feedstream. Hydrodenitrogenation is a subset of hydroprocessing processes.

The term "hydrodemetalization" or "HDM" as used herein is defined as a process in which a hydrocarbon feedstream is contacted with a catalyst and hydrogen at an elevated pressure and temperature wherein at least a portion the metal elements or compounds present in hydrocarbon feedstream are removed thereby resulting in at least one hydrocarbon product with a lower metal content than the hydrocarbon feedstream. Hydrodemetalization is a subset of hydroprocessing processes.

The term "catalytic hydrodewaxing" as used herein is defined as a catalytic hydrocracking process which uses molecular sieves, preferably zeolites, to selectively hydrocrack and/or isomerize waxes (i.e., long chain paraffinic molecules with greater than about 22 carbon molecules) present in the hydrocarbon streams to smaller carbon content molecules thereby resulting in an overall lower average boiling point product stream based on wt %. Catalytic hydrodewaxing is a subset of hydroprocessing processes.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

EXAMPLES

Example 1

This example describes how the CAT 100, CAT 200, CAT 300, and CAT 400 iMeH catalysts tested herein were fabricated. These iMeH catalysts were utilized for the performance testing described in Example 2 herein.

Chemical Composition of Tested Materials

The chemical compositions of the iMeHs tested in the Examples were as follows:

CAT 100=$Mm_{1.1}N_{4.22}Co_{0.42}Al_{0.15}Mn_{0.15}$
CAT 200=$Nd_{2.05}Dy_{0.25}Fe_{13}B_{1.05}$
CAT 300=$Mg_{1.05}Ni_{0.95}Cu_{0.07}$
CAT 400=$ZrV_2$

Sample Preparation for the CAT 400 iMeHs (New Composition)

The metal alloys based on zirconium-vanadium were prepared by melting together the appropriate stoichiometric amounts of metals with purity of 99.9% (from Alfa Aesar/Johnson Matthey Company™) in an argon atmosphere using water cooled copper hearth argon arc furnace Model CENTORR® from Centorr Vacuum Industries™, Nashua, N.H. Each arc-melted ingot was flipped over and re-melted three times and was normally held in the liquid state for approximately 30 seconds to insure complete mixing of the starting materials. The reduction in the sample weight was negligible.

To obtain single phase materials the cast samples were sealed in quartz tubes, filled with ⅓ atmosphere of argon gas and annealed at 950° C. for a period of 3 to 5 days using a Thermo scientific Lindberg/Blue™ tube furnace. The samples in the tubes were water quenched to avoid a possible phase transition during the cooling process.

The crystal structure of the CAT 400 samples was determined by powder X-ray diffraction. The crystal structure was determined to be single phase with cubic Laves phase C15 ($MgCu_2$) type for $ZrV_2$ alloys.

Sample Preparation for the CAT 100, CAT 200, and CAT 300 iMeHs (Prior Art Compositions)

The preparation of these metal alloys (CAT 100, CAT 200, CAT 300), annealing process and XRD measurement followed the same methods as described above for the CAT 400 preparation described above.

CAT 100 is based on $Mm(Ni, Co, Al, Mn)_5$ with a purity of approximately 99.5% for Mm (mischmetal or mixed rare earth), and about 99.9% for Ni, Co, Al and Mn. The weight losses due to evaporation of the Mm elements during the melting were compensated by starting with an excess of approximately 3 wt % of Mm. The crystal structure was determined to be hexagonal with $CaCu_5$ type.

CAT 200 is based on NdFeBDy with a purity of approximately 99.9%. The weight loss for Nd, Dy during melting was approximately 3%. The crystal structure is tetragonal with $Nd_2Fe_{14}B$ type.

CAT 300 is based on $Mg_2NiCu$ with a purity of about 99.9%. Due to high volatility of Mg the weight loss was about 10%. Excess Mg is added to allow for this loss. The crystal structure is cubic with $MoSi_2$ type.

Sample Preparation and Activation

The metal alloy bulk was crushed manually to an average particle size of approximately 200 μm (microns). The hard alloy samples were milled mechanically at cryogenic temperatures (approximately 80° K) and then were attrited. All samples were sieved to under approximately 200 μm (microns).

All particle size preparations of the samples were performed under inert nitrogen atmosphere conditions. The average particle size distribution was obtained using Horiba Laser-La-920® Particle Analyzer, from HORIBA Instruments™, Inc., Irvine, Calif.

Approximately 4 to 5 grams of metal alloy powder with known molecular weight was then placed into the stainless steel reactor connected to the Hy-Energy™ system. The reactor was then purged with hydrogen three times. $H_2$ pressure is introduced to the sample chamber from about 500 psig to about 800 psig at ambient temperature (i.e., 25° C.) and a waiting period is given to observe if any absorption takes place. A pressure drop in the reactor, generally in the range of about 20 psig depending on the amount of hydrogen absorbed, will indicate the hydrogen activation process. Typical waiting period times are from 10 to 30 minutes. If no absorption occurs, then the temperature is raised to about 250° C. The temperature needed to activate the sample depends on the active surface of the alloy. The sample starts absorbing hydrogen which is an exothermic process. The hydrogen activated sample is then cooled down to ambient temperature and pressure to achieve maximum hydrogen absorption.

Example 2

This example shows the effects of oxidation on the iMeH catalysts as well as calculates the amount of hydroprocessing activity that can be recovered from oxidized catalysts by using an embodiment of the regeneration process of the current invention. This example compares impacts to the first order rate constants of the iMeHs prepared in Example 1 above as tested in their 1) non-oxidized condition, 2) oxidized condition, and 3) oxidized & regenerated condition under hydroprocessing conditions 200° C. and 400 psig.

In this example, a sample of each iMeH was tested in each of the "non-oxidized" condition, the "oxidized" condition, and the "oxidized & regenerated" condition. The iMeH samples utilized in the testing of this example were prepared as follows.

Handling & Preparation of "Non-Oxidized" iMeH Samples

After charging with hydrogen, the hydride is attrited to an average particle size of 5 μm (microns) under nitrogen. After attrition the powder is loaded into a press and formed into a pellet at 30 tons for 10 minutes. The entire apparatus is enclosed in a nitrogen atmosphere for the duration of the procedure. After pressing the sample is transferred to a glove box where it is crushed, then sized to 90-300 μm (microns) for hydrotreating activity testing. When transfer of the sample was required (e.g. between hydriding and attritting or between pressing and sizing) the container is purged with nitrogen then sealed.

Handling & Preparation of "Oxidized" iMeH Samples

After charging with hydrogen, the hydride is attrited to an average particle size of 5 μm (microns) under nitrogen. After attrition the powder is loaded into a press and formed into a pellet at 30 tons for 10 minutes. This procedure was conducted open to the laboratory atmosphere without any special precautions taken. After pressing the sample is crushed, and then sized to 90-300 μm (microns) for testing in the laboratory atmosphere.

Handling & Preparation of "Oxidized & Regenerated" iMeH Samples

Oxidized iMeH samples were prepared as described above. Prior to activity testing, the samples were loaded (without feed) into the reactor in air. The system was purged with nitrogen at room temperature. The system was then pressurized with nitrogen to 500 psig and held for 30 minutes. The system was then depressurized to 1 psig. This cycle was repeated five (5) times. The temperature was raised to 150° C. under nitrogen for 2 hours. The process gas was then changed to 100% hydrogen and purged for 2 hours. The temperature was then increased to 250° C. and held for 2 hours and increased again to 360° C. and held for 2 hours. The reactor then cooled to room temperature (25° C.). To ensure full hydrogen capacity the system was then pressurized to 400 psig hydrogen and held for 1 hour before depressurizing. The system is then purged with nitrogen before activity testing.

Hydrotreating Activity of the Interstitial Metal Hydrides

Each iMeH sample prepared was tested for hydroprocessing (i.e., hydrotreating) activity under similar severe hydroprocessing conditions of 200° C. and 400 psig in each their non-oxidized, oxidized, and oxidized & regenerated conditions. A mixture of three (3) model compounds was utilized in this testing to observe the conversion rates of typical compounds found in heavy hydrocarbons whose conversion is targeted for product upgrading under hydroprocessing conditions. The testing and results for each iMeH sample in this example were performed according to the following procedures.

The reactor testing unit consisted of a multi-well, high-pressure batch reactor that holds 48×3 mL alumina vials. The vials are covered with a plate containing 48 pinholes to allow gas flow into and out of the vials, but limit liquid losses. The "non-oxidized" iMeH and feed loading and unloading were done in a glove box under nitrogen. The "oxidized" iMeH samples were loaded in an open laboratory atmosphere and left in that oxygen containing environment for at least 8 hours before testing. Unloading was conducted in a glove box under nitrogen. The "oxidized & regenerated" iMeH samples were loaded and regenerated as described in the preparation method described above. Unloading was conducted in a glove box under nitrogen. The iMeH was added in 32.5 microliter increments to 1.5 mL of feed to simulate space velocity. Mixing was accomplished with an orbital shaker at 300 rpm. A feed mixture containing three model compounds was used for catalyst activity evaluation. The feed mixture was poly alpha olefin based (PAO, 6 centistokes) and spiked with 0.3 wt % dibenzothiophene (DBT), 0.3 wt % 4,6-diethyl-dibenzothiophene (DEDBT), and 1 wt % 1-n-dodecylnaphthalene (C12N). Each reactor was purged with nitrogen and then hydrogen prior to activity testing. The reaction gas was 100% hydrogen. Activity testing was conducted at 200° C. and 400 psig, and held at those conditions for approximately 23 hrs. After which the reactor was cooled to room temperature and purged with nitrogen. Products were removed from the vials and subject to GC analysis.

The first order rate constants were then calculated from the results for each of the iMeH samples tested (for each of the "non-oxidized", "oxidized", and "oxidized & regenerated" conditions) for each of the model compounds.

The calculated "% Activity After Oxidation" of the four (4) sample interstitial metal hydrides ("iMeH"s) illustrates the drop in hydroprocessing activity experienced after oxidation of the iMeHs as compared to the same non-oxidized iMeH sample. The "% Activity After Oxidation" is based on a ratio of each iMeH's first order rate constant after oxidation (but without regeneration) divided by the iMeH's first order rate constant in its non-oxidized condition (expressed in percentage, %) for each of the three model compounds tested. The calculated results are presented in Table 1 and accompanying FIG. 3. As can be seen, in general, the hydroprocessing activity of each of the iMeHs was adversely affected to varying degrees by the oxidation of the iMeH.

The calculated "% Activity Recovery over Non-Oxidized Samples" of the four (4) sample interstitial metal hydrides ("iMeH"s) illustrates the recovery of activity experienced after subjecting the iMeHs to an embodiment of the regeneration process of the present invention as compared to the same interstitial metal hydrides in their non-oxidized condition. The "% Activity Recovery over Non-Oxidized Samples" by the present invention is based on a ratio of each iMeH's first order rate constant after oxidation & regeneration divided by the iMeH's first order rate constant in its non-oxidized condition (expressed in percentage, %) for each of the three model compounds tested. The calculated results are presented in Table 2 and accompanying FIG. 4. As can be seen, in general, the hydroprocessing activity of each of the oxidized iMeHs was improved/recovered to varying degrees after being subjected to an embodiment of the regeneration process of the present invention.

The calculated "% Activity Recovery over Oxidized Samples" of the four (4) sample interstitial metal hydrides ("iMeH"s) also illustrates the recovery of activity experienced after subjecting the iMeHs to an embodiment of the regeneration process of the present invention, however, in this calculation, as compared to the same interstitial metal hydrides after oxidation, but prior to regeneration. The "% Activity Recovery over Oxidized Samples" by the present invention is based on a ratio of each iMeH's first order rate constant after oxidation & regeneration divided by the iMeH's first order rate constant after oxidation, but prior to regeneration (expressed in percentage, %) for each of the three model compounds tested. The calculated results are presented in Table 3 and accompanying FIG. 5. As can be seen, in general, the hydroprocessing activity of each of the oxidized iMeHs was improved/recovered to varying degrees after being subjected to an embodiment of the regeneration process of the present invention.

What is claimed is:

1. A process for regenerating an interstitial metal hydride catalyst comprising the steps of:
   a) contacting a catalyst comprised of an interstitial metal hydride with a regeneration gas at a pressure $P_1$;
   b) lowering the pressure of the regeneration gas to a pressure $P_2$, wherein $P_2$ is less than $P_1$ to produce a regenerated catalyst;
   c) contacting the regenerated catalyst with a hydrocarbon feedstream under hydroprocessing conditions of at least 200° C. and at least 400 psig in the presence of hydrogen; and
   d) recovering an upgraded reaction product stream.

2. The process of claim 1, wherein the regeneration gas is comprised of at least 90 mol % of hydrogen, nitrogen, argon, helium, methane, and combinations thereof.

3. The process of claim 1, wherein the catalyst is subjected to more than one cycle of contact with a regeneration gas, wherein a cycle is defined as contact of the catalyst at a pressure greater than or equal to $P_1$ followed by a lowering of pressure to less than or equal to $P_2$.

4. The process of claim 2, wherein $P_1$ is from about 100 psig to about 3,000 psig, and $P_2$ is from about 15 psig to about 2,500 psig and the difference between $P_1$ and $P_2$ is at least 200 psig.

5. The process of claim 2, wherein the pressure of the regeneration gas is held at or greater than $P_1$ for about from 5 to about 300 minutes prior to depressurizing the inert gas to less than or equal to $P_2$.

6. The process of claim 1, wherein step c) is performed in the presence of a hydrogen-rich gas containing at least 50 mol % hydrogen.

7. The process of claim 1, wherein the catalyst is further comprised of at least Group 6, 8, 9, or 10 transition metal element.

8. The process of claim 7, wherein the transition metal element is selected from Mo, W, Co, and Ni.

9. The process of claim 7, wherein the transition metal element is in the sulfided metal condition.

10. The process of claim 1, wherein the interstitial metal hydride has been exposed to an oxidizing atmosphere prior to step a).

11. The process of claim 1, wherein the hydrocarbon feedstream is comprised of a biofuel.

12. The process of claim 1, wherein the hydrocarbon feedstream substantially consists of a biofuel.

13. A process for regenerating an interstitial metal hydride catalyst comprising the steps of:

a) contacting a bed of catalyst with a regeneration gas at a pressure $P_{sweep}$, wherein the catalyst is comprised of an interstitial metal hydride;

b) flowing the regeneration gas through the bed of catalyst for at least 50 equivalent volumes to produce a regenerated catalyst;

c) recovering the regeneration gas as a waste stream;

d) contacting the regenerated catalyst with a hydrocarbon feedstream under hydroprocessing conditions of at least 200° C. and at least 400 psig in the presence of hydrogen; and e) recovering an upgraded reaction product stream.

14. The process of claim 13, wherein the catalyst is subjected to at least 100 equivalent volumes of the regeneration gas in step b).

15. The process of claim 13, wherein the regeneration gas is flowed through the bed of catalyst at an hourly space velocity of from about 1 to about 1000 cubic meters per hour of regeneration gas per cubic meter of catalyst bed.

16. The process of claim 13, wherein the regeneration gas is comprised of at least 90 mol % of hydrogen, nitrogen, argon, helium, methane, and combinations thereof.

17. The process of claim 13, wherein step d) is performed in the presence of a hydrogen-rich gas containing at least 50 mol % hydrogen.

18. The process of claim 13, wherein the catalyst is further comprised of at least Group 6, 8, 9, or 10 transition metal element.

19. The process of claim 18, wherein the transition metal element is selected from Mo, W, Co, and Ni.

20. The process of claim 18, wherein the transition metal element is in the sulfided metal condition.

21. The process of claim 13, wherein the interstitial metal hydride has been exposed to an oxidizing atmosphere prior to step a).

22. The process of claim 13, wherein $P_{sweep}$ is from about 100 psig to about 3,000 psig.

23. The process of claim 13, wherein the hydrocarbon feedstream is comprised of a biofuel.

24. The process of claim 13, wherein the hydrocarbon feedstream substantially consists of a biofuel.

* * * * *